(12) United States Patent
Kuo et al.

(10) Patent No.: US 11,577,293 B2
(45) Date of Patent: Feb. 14, 2023

(54) INDUCTION PRESSING PLATE TYPE REAL-TIME MONITORING APPARATUS

(71) Applicant: National Kaohsiung University of Science and Technology, Kaohsiung (TW)

(72) Inventors: Chun-Chih Kuo, Kaohsiung (TW); Tsung-Liang Wu, Kaohsiung (TW)

(73) Assignee: NATIONAL KAOHSIUNG UNIVERSITY OF SCIENCE AND TECHNOLOGY, Kaohsiung (TW)

( * ) Notice: Subject to any disclaimer, the term of this patent is extended or adjusted under 35 U.S.C. 154(b) by 695 days.

(21) Appl. No.: 16/590,035

(22) Filed: Oct. 1, 2019

(65) Prior Publication Data

US 2020/0376530 A1  Dec. 3, 2020

(30) Foreign Application Priority Data

May 31, 2019 (TW) .................. 108119014

(51) Int. Cl.
| | | |
|---|---|---|
| *B21C 51/00* | (2006.01) | |
| *G01L 1/12* | (2006.01) | |
| *B21D 37/10* | (2006.01) | |
| *G01H 11/02* | (2006.01) | |
| *B21D 22/02* | (2006.01) | |
| *G01M 5/00* | (2006.01) | |
| *B21D 28/34* | (2006.01) | |
| *G01M 7/02* | (2006.01) | |

(52) U.S. Cl.
CPC .............. *B21C 51/00* (2013.01); *B21D 22/02* (2013.01); *B21D 28/34* (2013.01); *B21D 37/10* (2013.01); *G01H 11/02* (2013.01); *G01L 1/127* (2013.01); *G01M 5/0066* (2013.01); *G01M 7/025* (2013.01)

(58) Field of Classification Search
CPC ........ B21C 51/00; B21D 22/02; B21D 28/04; B21D 28/34; B21D 37/10; G01H 11/02; G01L 1/127; G01M 5/0066; G01M 7/025; H05B 6/101; H05B 6/105
See application file for complete search history.

(56) References Cited

U.S. PATENT DOCUMENTS

2016/0079585 A1* 3/2016 Mayrl-Sada ........ H01M 50/543
72/352

FOREIGN PATENT DOCUMENTS

| CN | 106180364 A | * | 12/2016 | ............. B21C 51/00 |
| CN | 107931432 A | * | 4/2018 | ............. B21C 51/00 |
| CN | 207401990 U | * | 5/2018 | ............. B21C 51/00 |

* cited by examiner

*Primary Examiner* — David L Singer
(74) *Attorney, Agent, or Firm* — WPAT, PC

(57) ABSTRACT

An induction pressing plate type real-time monitoring apparatus, including a fixing portion, an abutting portion, and an inductor. The fixing portion has a hole for fixing and connecting a fastener to an upper or lower platform of a forming device. The abutting portion is connected to the fixing portion, and the abutting portion in at least part of a pressure surface region is configured to press a tested piece to be induced. The inductor is disposed at the abutting portion, and has an induction unit for inducing actual information transmitted to the abutting portion by the direct contact of the tested piece and converting the actual information into measurable data, an output unit for outputting the data, and a power supply unit for providing power to the induction unit and the output unit.

9 Claims, 3 Drawing Sheets

_US 11,577,293 B2_

INDUCTION PRESSING PLATE TYPE REAL-TIME MONITORING APPARATUS

TECHNICAL FIELD

The present invention relates to a real-time monitoring apparatus, and in particular, to an induction pressing plate type real-time monitoring apparatus for tightly fixing a tested piece to a forming device.

BACKGROUND

At present, in the development of intelligent machinery in Taiwan, management systems developed based on the Internet of Things technology is more mature. However, it is difficult to break through the technical problems due to the industry Know-How. For example, as early as 20 years ago, manufacturers have proposed the requirement of preventing punch breakage during the operation of stamping dies.

However, traditionally, general factories determine whether to replace mechanical parts mostly by experience. In the most conservative way, the factory master predicts the replacement timing of the parts. The case that "the part is replaced immediately because of the time, even if the part may still be used" often results in unnecessary waste of parts.

At present, intelligent applications based on the Internet of Things technology are equipment availability monitoring, power consumption management, etc., which belongs to the "data information management" technology. However, it is not easy to develop the applications involving industrial expertise, especially the Know-how of processing technology, in large scale in a short period of time. "It still takes time for development", for example, a monitoring system induces abnormal signals through sensors, but the key is the installation positions and quantity of sensors. Finding the most sensitive and most important factors affecting the processing quality is the most difficult part in the whole technological development.

SUMMARY

An objective of the present invention is to provide an induction pressing plate type real-time monitoring apparatus for tightly fixing a tested piece to a forming device, so that when the tested piece operates, the most realistic data of the tested piece can be obtained in real-time for analysis.

To achieve the foregoing objective, the present invention provides an induction pressing plate type real-time monitoring apparatus, including: a fixing portion having a hole for fixing and connecting a screw fastener to an upper or lower platform; an abutting portion connected to the fixing portion, the abutting portion in at least part of a pressure surface region being configured to press a tested piece to be induced; and an inductor disposed at the abutting portion and having an induction unit for inducing actual information transmitted to the abutting portion by the direct contact of the tested piece and converting the actual information into measurable data, an output unit for outputting the data, and a power supply unit for providing power to the induction unit and the output unit.

In an embodiment, the die is a stamping die, and the tested piece is a punch.

In an embodiment, the punch is a die-cutting punch.

In an embodiment, the hole of the fixing portion is a slot.

In an embodiment, the actual information includes load applied to the inductor by the tested piece.

In an embodiment, the actual information includes vibration applied to the inductor by the tested piece.

In an embodiment, the actual information includes noise applied to the inductor by the tested piece.

In an embodiment, the actual information includes load, vibration, and noise applied to the inductor by the tested piece.

In an embodiment, the tested piece is a die.

The present invention is characterized in that the present invention is applied to tightly buckling various parts of the die, so that the buckled die is fastened to a pressure plate of the upper platform or the lower platform of the forming device and the inductor is disposed therein, so as to install the inductor at the position closest to a sensing source, thereby reducing the situation that the sensing value is distorted because the inductor is far away and indirectly located at the tested position. The present invention is installed at a pressure surface of the pressure plate, and the sensor is disposed inside the pressure surface. Therefore, the present invention provides a surface adjacent and parallel to the sensed surface, and thus extremely accurate measurement data can be obtained.

DETAILED DESCRIPTION

Embodiments of the present invention are described in detail below with reference to the accompanying drawings. The accompanying drawings are mainly simplified schematic diagrams, and only illustratively describe the basic structure of the present invention. Therefore, only components associated with the present invention are marked in the accompanying drawings. Moreover, the components shown are not drawn in the number, shape, dimension scale, etc. at the time of implementation, and the actual size during implementation is a selective design, and the component layout may be more complicated.

Figure 1:
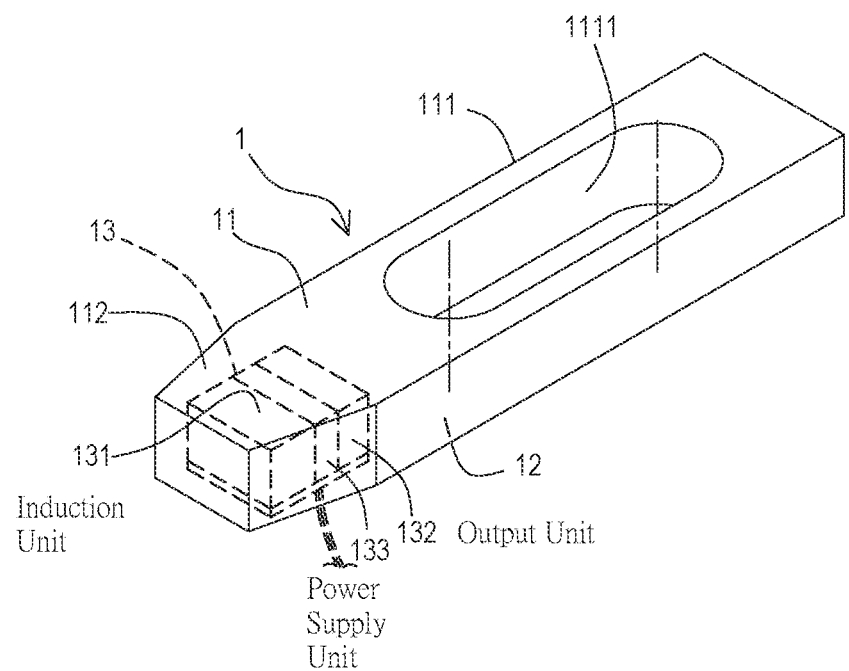
FIG. 1 is a perspective view of an induction pressing plate according to an embodiment of the present invention.
Figure 2:
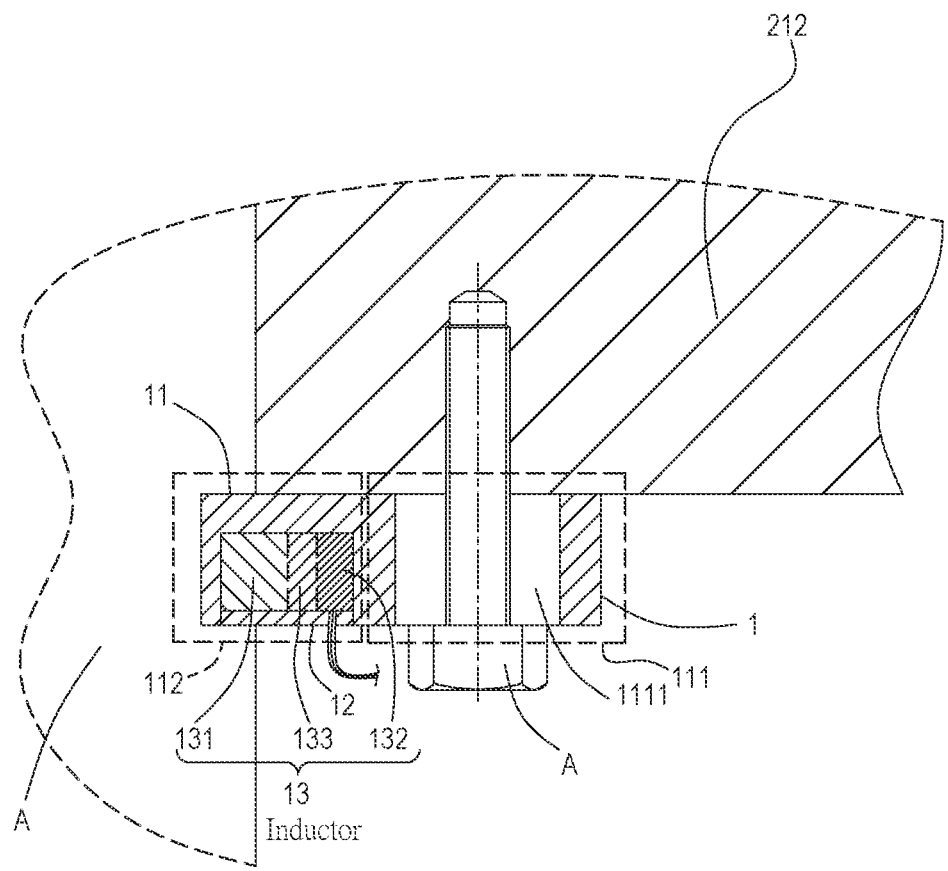
FIG. 2 is a cross-sectional view showing the induction pressing plate fixing a tested piece according to an embodiment of the present invention.
Figure 3:
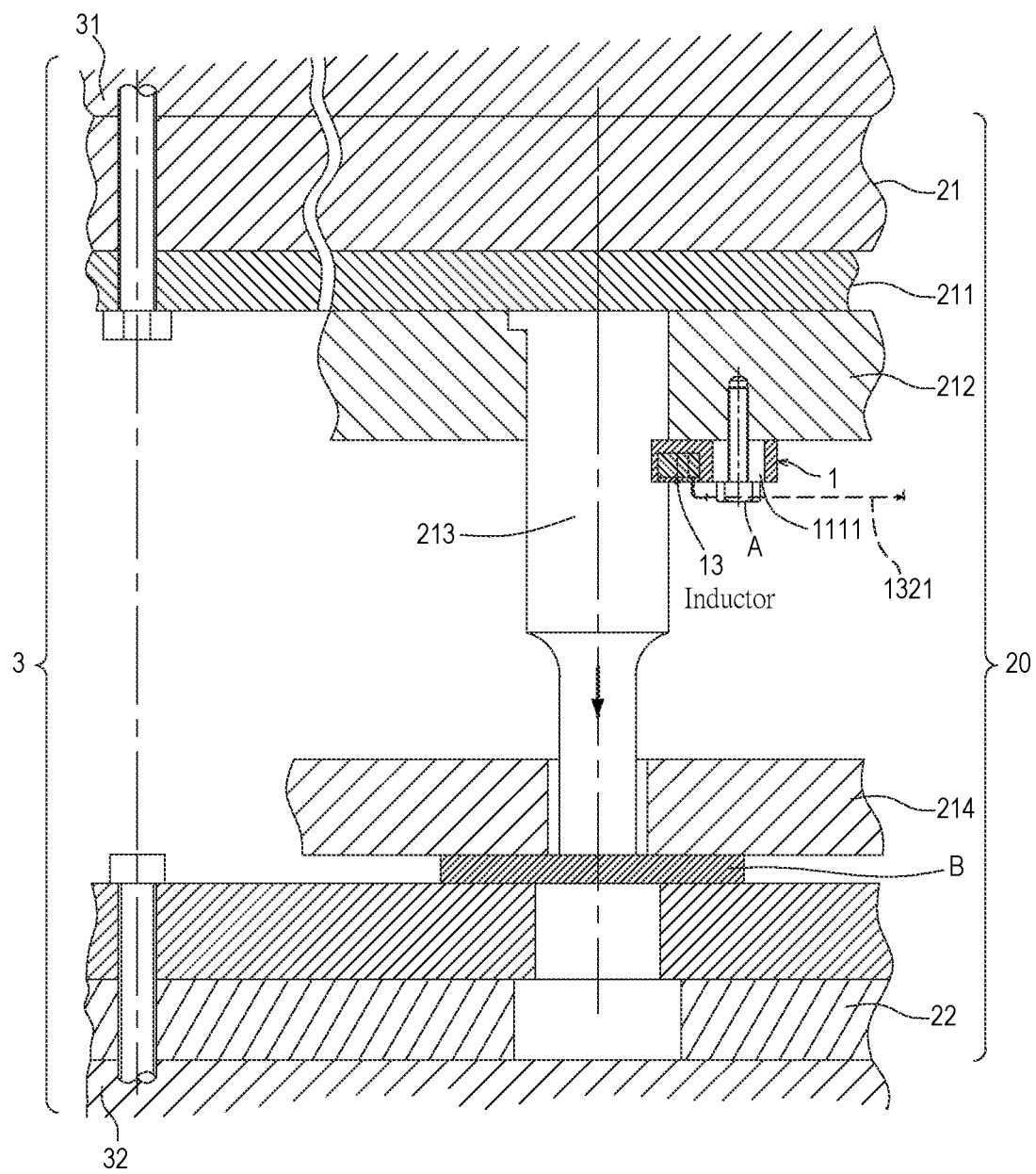
FIG. 3 is a cross-sectional view showing the induction pressing plate fixing a punch according to an embodiment of the present invention.
Figure 4:
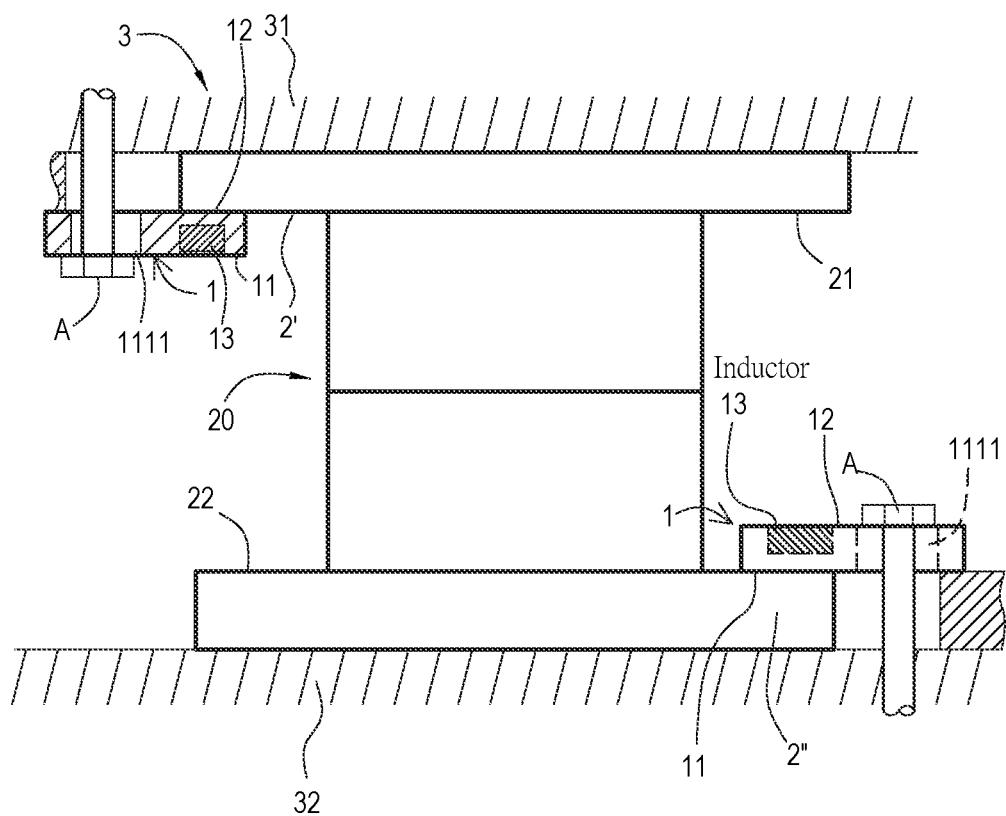
FIG. 4 is a cross-sectional view showing the induction pressing plate fixing the punch according to an embodiment of the present invention.

Please refer to FIGS. 1 to 4. The induction pressing plate type real-time monitoring apparatus of this embodiment is suitable for tightly fixing a tested piece (2, 2', 2") to a forming device 3. The forming device 3 includes an upper platform 31 and a lower platform 32. The induction pressing plate 1 includes a pressure surface 11 and a back surface 12.

The pressure surface 11 has a fixing portion 111 having a hole (not shown) for fixing and connecting a fastener A to the upper platform 31 or the lower platform 32.

An abutting portion 112 is connected to the fixing portion 111, and the abutting portion 112 in at least part of a pressure surface 11 region is configured to press the tested piece (2, 2', 2") to be induced.

An inductor 13 is disposed at the abutting portion 112, and has an induction unit 131 for inducting actual information transmitted to the abutting portion 112 by a direct contact of the tested piece (2, 2', 2") and converting the actual information into measurable data 1321, an output unit 132 for outputting the data 1321, and a power supply unit 133 for providing power to the induction unit 131 and the output unit 132.

The induction pressing plate 1 described above is a fixture for fixing the die 20, i.e., the tested piece (2, 2', 2") to the upper platform 31 and the lower platform 32 of the forming device 3. Therefore, the induction pressing plate type real-time monitoring apparatus of the present invention is in direct and parallel contact with and presses the tested die 20 (including any of the components thereof, such as an upper die base 21, a punch backing plate 211, a punch fixing plate 212, a punch 213, a pressure plate 214, and a lower die base 22). On this basis, compared with the conventional approach that a sensing screw apparatus in which a sensor is disposed in a screw is in indirect and vertical contact with the tested piece, the method of disposing the inductor on the pressure plate of the present invention can fully capture the physical characteristics such as vibration, noise and load of the tested piece with less distortion.

In an embodiment, the tested piece (2', 2") of the present invention includes any of the components of the die 20, such as the upper die base 21, the punch backing plate 211, the punch fixing plate 212, the punch 213, the pressure plate 214 and the lower die base 22.

In an embodiment, the die 20 of the present invention may be a stamping die, and the tested piece 2 is a punch.

In an embodiment, the punch of the present invention may be a drawing punch, a flange bending punch, and a die-cutting punch.

The hole 1111 of the fixing portion 111 of the present invention may be a slot.

The actual information of the present invention includes one or any combination of the physical characteristics such as the load applied to the inductor 13 by the tested piece (2, 2', 2"), the vibration energy or frequency, the noise made by the tested piece (2, 2', 2") or the like.

The foregoing embodiments are merely illustrative of the principles, features, and effects of the present invention, and are not intended to limit the scope of the present invention. Those skilled in the art can make modifications and changes to the foregoing embodiments without departing from the spirit and scope of the present invention. Any equivalent changes and modifications made using the content disclosed in the present invention should still fall within the scope of the appended claims.

What is claimed is:

1. An induction pressing plate type real-time monitoring apparatus for tightly fixing a tested piece to a forming device comprising an upper platform and a lower platform, and the induction pressing plate comprises:
   a fixing portion having a hole for fixing and connecting a fastener to the upper platform or the lower platform;
   an abutting portion connected to the fixing portion, the abutting portion in at least part of a pressure surface region being configured to press the tested piece to be induced; and
   an inductor disposed at the abutting portion and having an induction unit for inducing actual information transmitted to the abutting portion by a direct contact of the tested piece and converting the actual information into measurable data, an output unit for outputting the data, and a power supply unit for providing power to the induction unit and the output unit.

2. The induction pressing plate type real-time monitoring apparatus according to claim 1, wherein the forming device is a stamping die, and the tested piece is a punch.

3. The induction pressing plate type real-time monitoring apparatus according to claim 2, wherein the punch is selected from the group consisting of a drawing punch, a flange bending punch, and a die-cutting punch.

4. The induction pressing plate type real-time monitoring apparatus according to claim 2, wherein the actual information comprises load, vibration and noise applied to the inductor by the tested piece.

5. The induction pressing plate type real-time monitoring apparatus according to claim 1, wherein the hole of the fixing portion is a slot.

6. The induction pressing plate type real-time monitoring apparatus according to claim 1, wherein the actual information comprises load applied to the inductor by the tested piece.

7. The induction pressing plate type real-time monitoring apparatus according to claim 1, wherein the actual information comprises vibration applied to the inductor by the tested piece.

8. The induction pressing plate type real-time monitoring apparatus according to claim 1, wherein the actual information comprises noise made by the tested piece.

9. The induction pressing plate type real-time monitoring apparatus according to claim 1, wherein the tested piece is a die.

* * * * *